United States Patent [19]

Arpiarian et al.

[11] Patent Number: 4,818,174
[45] Date of Patent: Apr. 4, 1989

[54] COMPACT ROBOT ARM MEMBER RELATIVE MOVEMENT SENSOR

[75] Inventors: Archie H. Arpiarian, Cambridge; Mohammed M. Khusro, Andover, both of Mass.

[73] Assignee: Polaroid Corporation, Cambridge, Mass.

[21] Appl. No.: 484,229

[22] Filed: Apr. 12, 1983

[51] Int. Cl.⁴ ............................ B25J 9/00; B25J 17/02
[52] U.S. Cl. ...................................... 414/735; 901/45; 901/47; 901/29; 901/9; 73/800; 338/15; 356/152
[58] Field of Search ..................... 414/735; 901/44, 45, 901/46, 47, 29, 9; 73/800; 356/141, 150, 152, 153; 33/1 PT, 1 MP, 363 K, 314, 169 C, 309; 340/709, 365 P; 338/15, 128; 178/18; 250/227, 561, 211 K, 221, 201 AF

[56] References Cited

U.S. PATENT DOCUMENTS

| 2,317,632 | 4/1943 | Miller | 33/309 |
|---|---|---|---|
| 3,526,748 | 9/1970 | Reinks | 219/131 |
| 3,824,674 | 7/1974 | Inoyama et al. | 901/45 X |
| 3,918,814 | 11/1975 | Weiser | 356/152 X |
| 4,076,131 | 2/1978 | Dahlstrom et al. | 414/735 X |
| 4,179,783 | 12/1979 | Inoyama et al. | 901/46 X |
| 4,309,618 | 1/1982 | Carter, Jr. | 901/46 X |
| 4,330,204 | 5/1982 | Dye | 356/152 |
| 4,445,029 | 4/1984 | Nagaoka et al. | 250/201 AF |

OTHER PUBLICATIONS

IBM Technical Disclosure Bulletin, "Position Detecting Apparatus", H. R. Rottman, vol. 9, #5, Oct. 1966.

Primary Examiner—Robert J. Spar
Assistant Examiner—Donald W. Underwood
Attorney, Agent, or Firm—John J. Kelleher

[57] ABSTRACT

Apparatus for determining when the hand of a robot arm, resiliently mounted on a robot arm body, strikes or makes contact with an object that impedes or limits its movement, employs an optical fiber in place of conventional light focusing optics to produce a compact and ruggedized robot arm member relative movement sensor. The apparatus includes a light source mounted in a particular location on the robot arm hand and a light sensitive device spaced from the light source and mounted in a particular location on the robot body, a device that is capable of continuously generating a hand-to-robot arm body relative position signal in response to the particular location of collimated light from the robot hand mounted light source that passes through a light collimating optical fiber and strikes the light sensitive surface of the light sensitive device. Relative movement between the robot arm body and the robot hand resulting from contact between a motion-impeding object and the robot hand causes the light sensitive device to generate a signal indicative of such object contact and/or extent of relative hand-to-robot arm movement. The use of an optical fiber in the light path in place of a conventional lens makes it possible to employ this relative movement sensing apparatus in a vibratory environment and also makes it possible to shorten the light path length and thereby reduce the size of said relative motion sensing apparatus.

16 Claims, 5 Drawing Sheets

COMPACT ROBOT ARM MEMBER RELATIVE MOVEMENT SENSOR

BACKGROUND OF THE INVENTION

The present invention relates to positioning apparatus in general, and to relatively compact apparatus for controlling movement of a positioning device commonly referred to as an industrial robot, in particular.

Automated product assembly machines, for example, have been employed in manufacturing industries for a great number of years. More recently, though, technologically more sophisticated machines have been employed for such purposes. These more recent machines are commonly referred to as industrial robots. Industrial robots are capable of performing various mechanical operations with a high degree of speed and accuracy in response to a set of programmed instructions.

Common uses for industrial robots include the movement of a workpiece from one position to another and the performance of repetitive operations with a high degree of precision. The use of industrial robots in place of human personnel has proven very beneficial in that they have resulted in both cost reductions and processing accuracy and have relieved many personnel from routine and/or potentially hazardous jobs. Industrial robots are also employed in numerous other fields of technology to perform a variety of different operations.

A significant problem associated with industrial robots, especially those employed for product assembly purposes, is their inability to recognize when they collide or make contact with objects located in their path of travel when moving to perform programmed tasks. Inasmuch as most industrial robots are capable of generating extremely large physical forces, such forces can seriously damage or even destroy such contacted objects, objects that have heretofore been undetectable when struck or contacted by any portion of a moving robot. A typical object damaging situation often occurs when an industrial robot is programmed to place a series of identical objects or piece-parts into fairly close tolerance openings or recesses in, for example, a series of housings, during product assembly, over an extended period of time. During this extended period of product assembly time, a gradual misalignment will often result between, for example, the center of the housing opening and the center of the piece-part that is being inserted into the housing opening. Such misalignment has heretofore been undetectable by an industrial robot. The consequences of the industrial robot being unable to detect such misalignment often are damage to the piece-part and/or to the housing, or to the robot itself because of the large physical forces that are sometimes generated by a robot as it blindly attempts to place a piece-part in a misaligned housing opening where it is incapable of detecting such misalignment.

In U.S. patent application Ser. No. 484,228 by M. KHUSRO, filed on the same date as the present application, robot arm member relative movement sensing apparatus is disclosed that determines when a relatively movable driven robot arm member moves out of positional alignment with a driving robot arm member. The apparatus includes a light source mounted on one member and a light sensitive device mounted on the other member that is capable of continuously generating a member-to-member relative position signal in response to light from said light source being optically focused on said light sensitive device. Relative movement between these two robot arm members causes the light sensitive device to generate an electrical signal representative of the extent of member-to-member relative movement However, by employing a conventional optical lens to focus a portion of the light from the light source onto a surface of the light sensitive device, the lens element must be spaced a relatively large distance from the light sensitive device surface in order to place the light sensitive surface at the lens element focal plane for proper light sensitive device operation. Providing this required space necessarily increases relative movement sensing apparatus size and/or length. In addition, the light focusing lens element mounting must be substantial enough to maintain the lens light path in a predetermined, relatively fixed orientation during robot arm operation including operations in a mechanical shock or highly vibratory environment. A lens element of a size employed in the above-noted patent application presents difficult mounting problems for a lens that must operate in such an environment.

A primary object of the present invention is to provide compact apparatus for detecting relative movement between members that are resiliently attached to one another.

Another object of the present invention is to provide relative movement sensing apparatus that can operate in a vibratory environment.

Still another object of the present invention is to provide compact apparatus for determining when a portion of an industrial robot arm comes in contact with a robot arm motion impeding object.

A further object of the present invention is to provide compact apparatus that will enable an industrial robot to apply a predetermined physical force to a particular object or workpiece, such as when forcing components together during product assembly, with a predetermined force.

Other objects, features and advantages of the present invention will be readily apparent from the following detailed description of the preferred embodiment thereof taken in conjunction with the accompanying drawings.

SUMMARY OF THE INVENTION

In accordance with the teachings of the present invention, compact apparatus is provided for determining when a relatively movable driven member moves out of positional alignment with respect to a drive member. The apparatus includes means for resiliently attaching said members to one another such that they are maintained in a predetermined positional relationship relative to one another A light source is mounted in a particular location on one member and a light sensitive device capable of continuously generating a member-to-member relative position signal in response to collimated light through an optical fiber from said light source striking the light sensitive surface of said light sensitive device, is mounted on the other member. Relative movement between said resiliently attached members causes said light sensitive device to generate an electrical signal representative of the extent of member-to-member relative movement. This signal may be employed to, for example, terminate drive member movement, cause a particular force to be applied to an object by said movable member or, in the case of an industrial robot, to facilitate robot programming.

DESCRIPTION OF THE PREFERRED EMBODIMENTS

Figure 1:
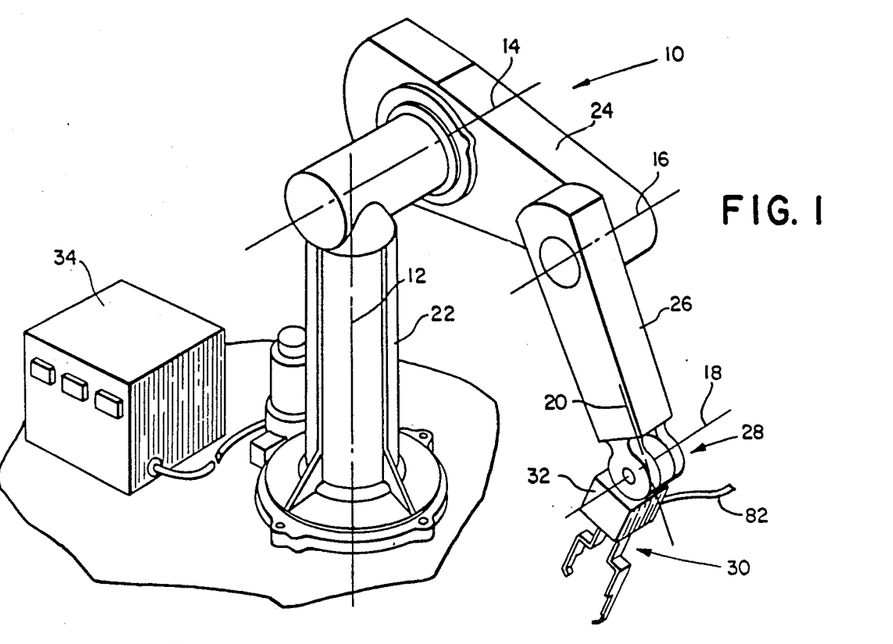
FIG. 1 is a perspective view of a conventional industrial robot incorporating the relative movement sensing apparatus of the present invention.

In FIG. 1 of the drawings, conventional industrial robot or robot arm assembly 10 incorporating a preferred embodiment of the present invention, is depicted Robot arm assembly 10 is a PUMA Model 600 that is manufactured by Unimation, Inc. of Danbury, Conn. Robot arm assembly 10 operates in accordance with an anthropomorphic coordinate system having six degrees of freedom with portions of said assembly being capable of limited rotational movement about axes 12, 14, 16, 18 and 20. Robot arm assembly 10 includes pedestal 22 having pedestal axis 12 about which all of the upper portions of assembly 10 can be rotated. In addition, lower arm 24 which is rotatably attached to pedestal 22, is rotatable about lower arm axis 14. Upper arm 26 which is rotatably attached to lower arm 24, is rotatable about upper arm axis 16. Wrist joint 28 is rotatable about two mutually orthogonal axes 18 and 20, said joint being tiltable with respect to upper arm 26 and pivotable about axis 20 which is the axis about which pneumatically actuated work-piece-holding gripper 30 is rotated. Gripper 30 is resiliently attached to said wrist joint 28 by relative movement sensing apparatus 32 of the present invention. Sensing apparatus 32 senses relative movement between wrist joint 28 and work-piece holding gripper 30 and generates an electrical signal representative of such relative movement. Robot assembly 10 is programmed by the so-called training method, i.e., gripper 30, that is resiliently attached to upper arm 26 through sensing apparatus 32, is manually moved to the desired gripper position(s) whereupon the coordinates of this particular gripper 30 position are stored in a memory established in robot control assembly 34 for the control of robot assembly 10.

As noted above, pneumatically actuated gripper 30 is resiliently attached to upper arm 26 through or by means of relative motion sensing apparatus 32 which incorporates the preferred embodiment of the inventive concept of the present invention. Relative motion sensing apparatus 32 will now be described in detail An enlarged elevational view of motion sensing apparatus 32 is shown in drawing FIG. 2 and an exploded perspective view of said apparatus 32 is shown in drawing FIG. 3A. With reference to drawing FIGS. 2 and 3A, photodiode housing 36, photodiode 38 and backplate 40 are attached to flange portion 42 of wrist joint 28 by a pair of mounting screws (only screw 44 shown). Photodiode 38 is a conventional dual-axis (X and Y) lateral effect photodiode that is available from United Detector Technology of Culver City, Calif. Photodiode 38 is nested in a recess in one side of housing 36 and the opposite side of housing 36 engages said flange portion 42 of wrist joint 28. Backplate 40, having a pair of mounting screw accepting openings 46a and 46b therein, engages the photodiode recess side of housing 36, thereby sandwiching photodiode 38 between housing 36 and backplate 40 when mounting screws 44, etc. extend through said openings 46a, 46b, through corresponding openings 48a and 48b in photodiode housing 36 and are fully threaded into cooperating threaded openings in wrist joint flange portion 42.

Front plate 50 is resiliently mounted on backplate 40 by a set of three spring-like, laterally resilient, compliant pads (only two, 52a and 52b, are shown). These compliant pads are commercially available from Lord Kinematics of Erie, Pa. A sectional view of one of said spring-like compliant pads is shown in drawing FIG. 3B. Pad 52a in drawing FIG. 3B consists of a plurality of flat, uniformly stacked, laminated steel discs 54, 56, etc., with each disc having a flat surface thereof adjacent another of said discs and with all of said discs being encapsulated in an elastomeric material Compliant pad 52a also includes a pair of mounting caps at the opposite ends thereof having threaded openings therein for mounting the compliant pad to backplate 40 and frontplate 50. The ends of compliant pad 52a, for example, are inserted into recesses 54a and 54b in backplate 40 and in frontplate 50, respectively, and is attached to said plates by screws 56a and 56b, respectively. The other two compliant pads are mounted to plates 40 and 50 in different plate recesses in the same manner. Compliant pads 54, 56, etc. are relatively incompressible or will experience only negligible deformation when force is applied normal to the surfaces of each stacked disc, but are flexible or are deformable when shear forces are applied in directions generally lateral to said compressive forces Laminated elastomeric spring-like compliant pads 52a, 52b, etc. provide multi-directional flexibility, with the chosen or tailored spring constants, in the required directions. Normally, spring constants are selected based on the forces required or the forces expected to be encountered in each situation. These commercially available pads do not require lubrication, require no adjustment, have low hysteresis, can take a fair amount of abuse, and have long live.

Figure 2:
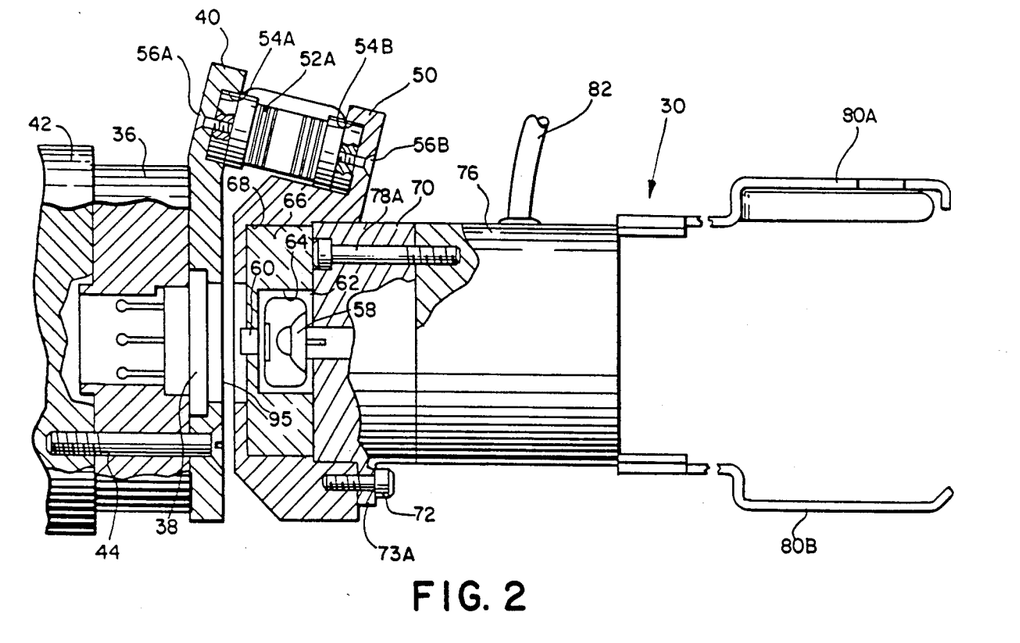
FIG. 2 is an enlarged elevational view, party in section, of the relative movement sensing apparatus shown in drawing FIG. 1.
Figures 3A, 3B:
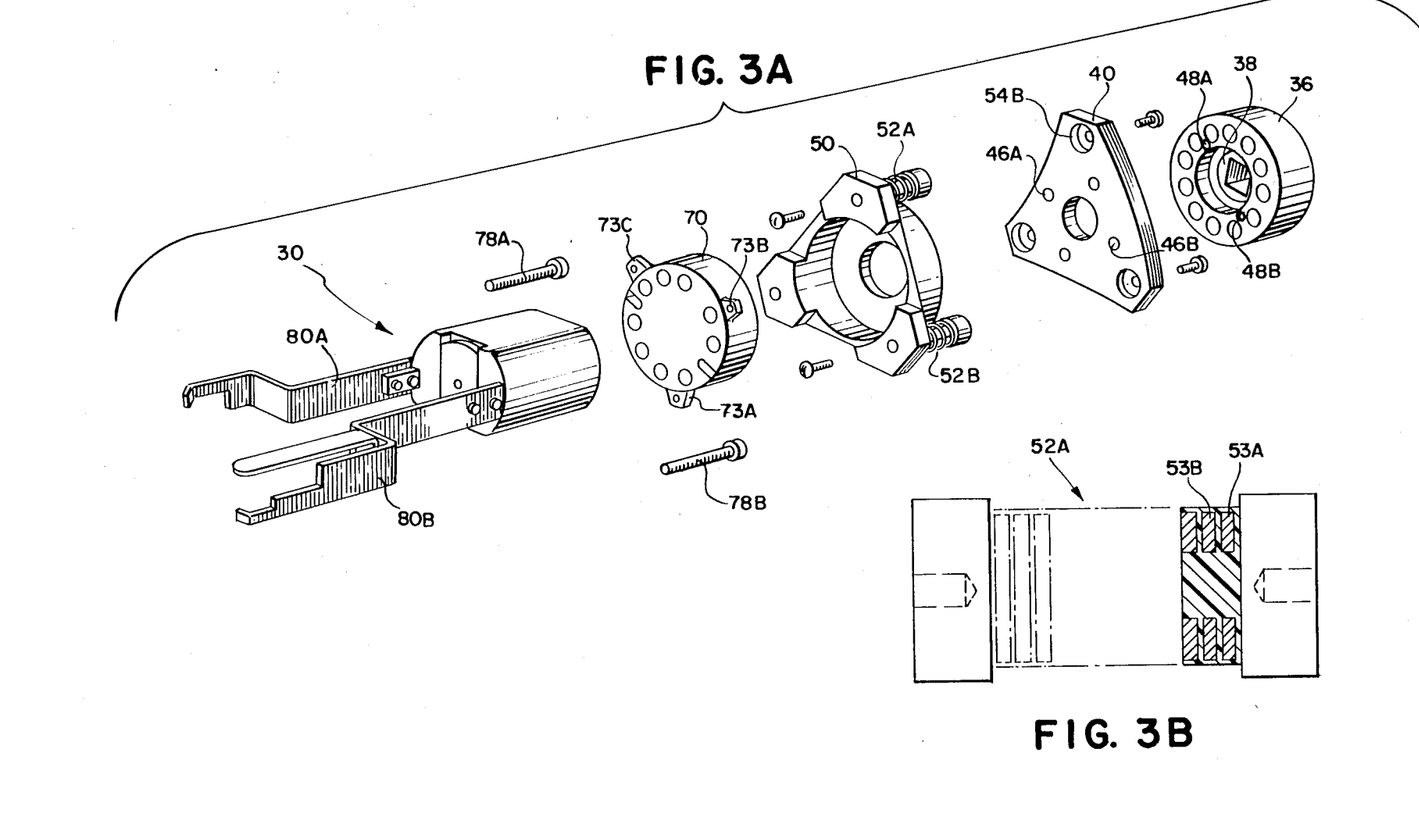
FIG. 3A is an exploded perspective view of the relative motion sensing apparatus shown in drawing FIG. 2.
FIG. 3B is a sectional view, in elevation, of one of the spring-like compliant pads employed in the relative motion sensing apparatus of the present invention.

High intensity infrared light emitting diode 58 and multi-mode optical fiber 60 are mounted in a fixed position in support housing 62 such that infrared light from light emitting diode 58 is optically directed or focused on one end of said fixedly mounted optical fiber 60. Other light sources such as lasers, laser diodes, non-infrared light emitting diodes or incandescent and fluorescent lamps may also be employed as a light source in place of diode 58. Optical fiber 60 is preferably a multi-mode fiber. However, a single mode fiber or an optical fiber bundle may also be employed in place of said multimode fiber 60. Support housing 62 is positioned in recesses 64 in intermediate support member 66 and said intermediate support member 66 is, in turn, positioned in recess 68 in frontplate 50. Endplate 70 is placed against the recess side of intermediate support plate 66 thereby confining support housing 62 within recess 64 of intermediate support member 66 and a set of three screws pass through respective openings in laterally extending endplate 70 tabs 73A, 73B and 73C and into threaded openings in frontplate 70, thereby maintaining light emitting diode 58 and optical fiber 60 in a fixed position with respect to frontplate 50. In order to adequately concentrate the light from light emitting diode 58 into a relatively high intensity homogeneous spot on the photosensitive surface of photodiode 38, the end of optical fiber 60 should be close enough to said surface for such concentration, but far enough away to avoid physical contact between the photodetector and the optical fiber. In this, the preferred embodiment, a spacing of approximately two (2) millimeters was found to be adequate. Pneumatic housing portion 76 of pneumatically actuated gripper 30 is attached to endplate 70 by a pair of screws 78A and 78B that pass through openings in endplate 70 and into threaded openings in pneumatic housing 76. Gripper 30 includes a pair of fingers 80a and 80b that move toward each other for workpiece gripping purposes when tube 82 is pressurized from a pressure source (not shown) by the actuation of a pressure control valve (not shown) in response to a signal from the robot arm control system 34 (FIG. 1).

Figure 4A:
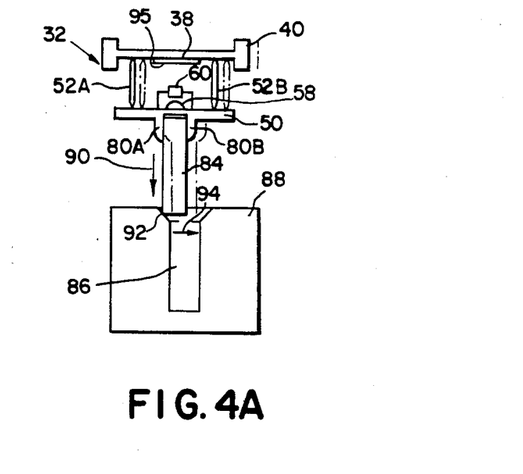
FIG. 4A is a schematic diagram of the initial position of a portion of an axially misaligned piece-part inserting robot arm incorporating the relative motion sensing apparatus of the present invention.
Figure 4B:
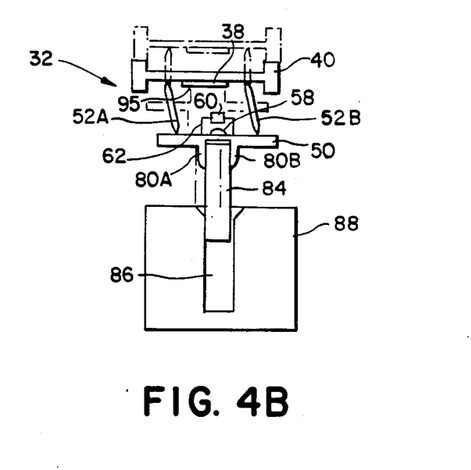
FIG. 4B is a schematic diagram showing the apparatus of FIG. 4A partially inserting the piece-part into a mating piece-part receiving opening.
Figure 5A:
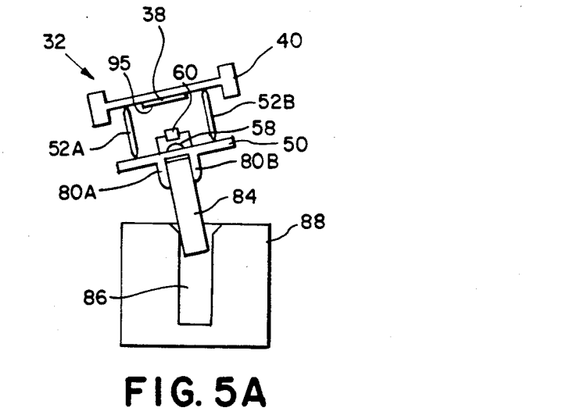
FIG. 5A is a schematic diagram of the initial position of a portion of a piece-part inserting robot arm holding the piece-part at an acute angle to a piece-part receiving opening.
Figure 5B:
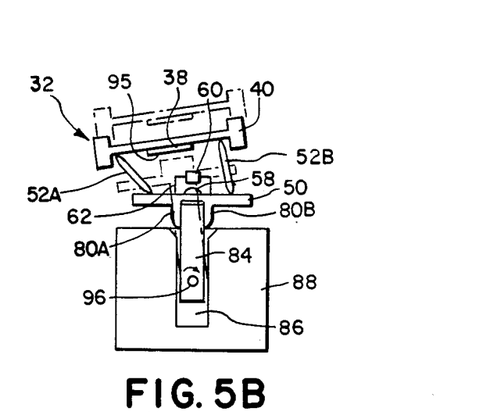
FIG. 5B is a schematic diagram showing the apparatus of FIG. 5A partially inserting the piece-part into a mating piece-part receiving opening.

Movement sensing apparatus 32 is, in part, a compliant device that performs around a point about which rotation will occur when a moment is applied and pure translation occurs when a force is applied to said apparatus 32. FIGS. 4A and 4B schematically show how lateral error is accommodated when interference is experienced by apparatus 32, and FIGS. 5A and 5B schematically show how apparatus 32 mechanically operates when there is a moment-causing axial misalignment between mating parts.

In FIG. 4A, grippers 80a and 80b attached to one end of robot arm 10 (FIG. 1) mounted relative motion sensing apparatus 32 attempts to place pin 84 in opening 86 of receiving member 88 as pin 84 is moved in axial direction 90, ut is unable to initially do so because of the interference between pin 84 and champfered surface 92 at the entrance to opening 86 of receiving member 88 due to lateral misalignment of pin 84 with respect to said opening 86. As pin 84 continues to be moved in axial direction 90, such movement and the reaction from champfered surface 92 initiate lateral movement of said pin 84, frontplate 50 and support housing 62, on which light emitting diode 58 and light collimating optical fiber 60 are mounted, in direction 94. In FIG. 4B, pin 84 has made sufficient lateral movement to enable said pin 84 to fully enter the main portion of opening 86 in receiving member 88. As a direct consequence of this pin 84 lateral movement, spring-like compliant pads 52a, 52b, etc., laterally distort to enable such movement, thereby causing light from diode 58 passing through light collimating optical fiber 60 and falling in the shape of a spot on photosensitive surface 95 of photodiode 38 to move to another position on said photosensitive surface. The effect of such light spot movement on photosensitive surface 95 of photodiode 38 will be explained below in detail. For the present, however, it is this light spot movement on said light or photosensitive surface that causes photodiode 38 to generate an electrical relative movement or position signal In FIG. 5A, grippers 80a and 80b attached to one end of robot arm 10 (FIG. 1) mounted relative movement sensing apparatus 32 now attempts to place said pin 84 in opening 86 of receiving member 88 as pin 84 is moved in a direction that is at an acute angle to the longitudinal axis of opening 86. While pin 84 is able to partially enter opening 86, said pin 84 is initially unable to fully enter opening 86 until the longitudinal axis of pin 84 is aligned (parallel and/or coincident) with the longitudinal axis of opening 86, because of this initial motion limiting angular misalignment. As pin 84 continues to be moved in the same direction, said pin 84, frontplate 50 and support housing 62, on which light emitting diode 58 and light collimating optical fiber 60 are mounted, experience rotational movement. In FIG. 5B, pin 84 has made sufficient rotational movement about axis 96 to enable said pin 84 to fully enter opening 86 in receiving member 88. As in the previously described example, compliant pads 52a, 52b, etc., laterally distort to enable such rotational movement again causing the spot of light from light emitting diode 58 falling on the photosensitive surface of photodiode 38 to move to another position on said photosensitive surface, the effect of such movement, as mentioned above, is to be described below in detail.

Figure 6A:
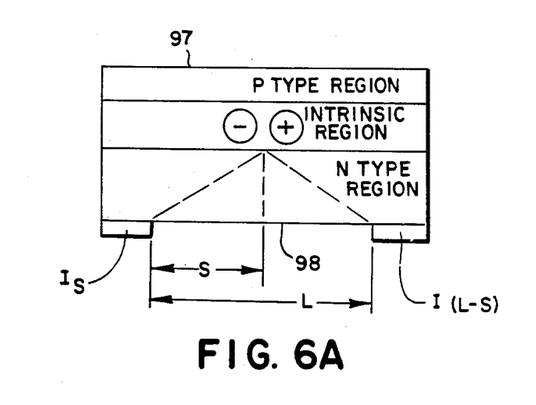
FIG. 6A is a cross-sectional view, in schematic, of the photosensitive device employed in the relative motion sensing apparatus of the present invention.
Figure 6B:
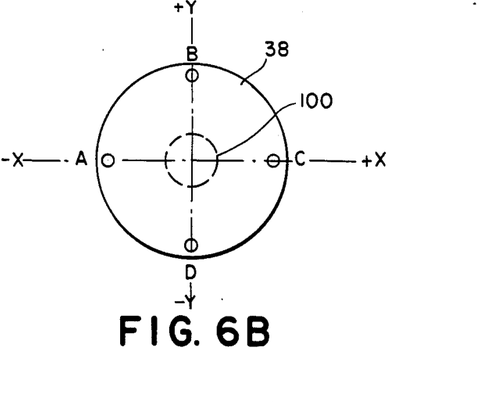
FIG. 6B is a schematic diagram of the external housing of a dual axis photodetector showing four external electrical connections and showing the X and Y coordinates of its light sensitive surface.

The operation of conventional two-terminal single axis lateral effect photodiode 97, similar in operation to one of the two axes of dual axis lateral effect photodiode 38 in motion sensing apparatus 32 of the present invention, will now be described in detail. A schematic diagram of said two-terminal photodiode 97 is shown in drawing FIG. 6A. With reference to said FIG. 6A, the current $I_s$ at position S, which is the position on the photosensitive surface 98 of photodiode 97 where a spot of concentrated light from a light source falls on said surface, is given by the equation:

$$I_s = I_o \left( I - \frac{S}{L} \right)$$

where
$I_o$ is Photoinduced current
I line current
S position S
L width of detector For a dual axis photodiode such as photodiode 38 in the motion sensing apparatus of FIG. 2, whose four external contacts are A, B, C, and D, as shown in drawing FIG. 6B, the electrical signal representing the X and Y position of a light spot such as light spot 100 in said drawing FIG. 6B, may be expressed as:

$$X \text{ position} = \frac{A - C}{A + C}$$

$$Y \text{ position} = \frac{B - D}{B + D}$$

Figure 7:
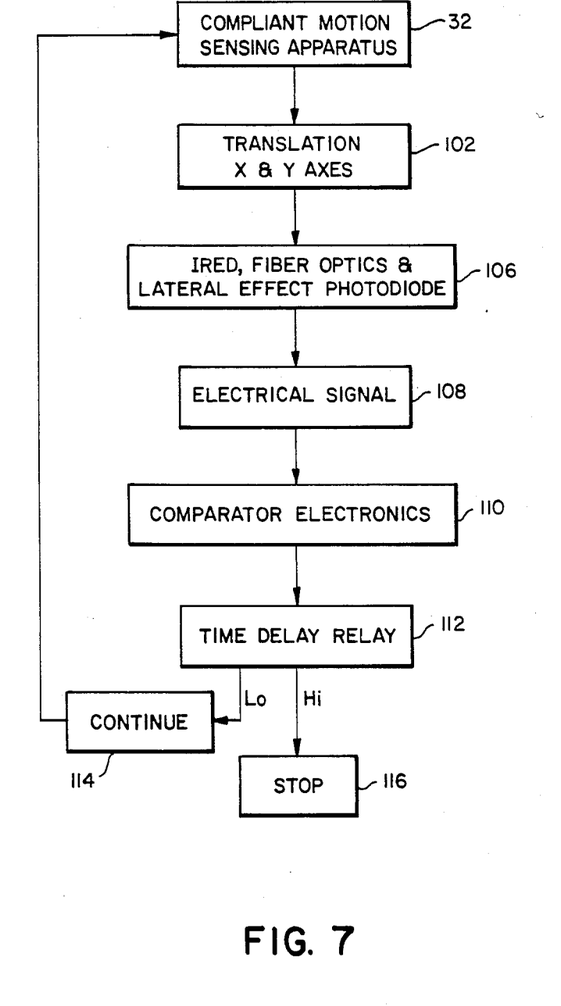
FIG. 7 is an information flow block diagram of the motion sensing apparatus of the present invention operating in its position sensing mode of operation.

As mentioned above, motion sensing apparatus 32 can be employed in at least two different modes of operation. In one mode, changes in the relative position between the robot hand and the robot arm body are monitored for the purpose of interrupting or terminating robot arm movement due to robot arm interference. In another mode of operation, changes in the relative position of the robot hand (gripper 30) and the robot arm body are monitored for the purpose of sensing inertial forces or for applying a force to a body of a predetermined magnitude. FIG. 7 shows an information flow block diagram of the motion sensing apparatus of the present invention operating in the robot arm motion interrupting mode. With reference to FIGS. 4A, 4B and 7, if, for example, front plate 50 of motion sensing apparatus 32 should be laterally moved or translated in the X and/or Y direction (102) against the tailored or chosen force of compliant pads 52a, 52b, etc., the spot of light from high intensity infrared light emitting diode 58 through multimode optical fibers 60 falling on photosensitive surface 95 of photodiode 38 will move from its initial position on said surface 95 to a position linearly related to the relative movement between front plate 50 supporting pneumatically actuated gripper assembly 30 and wrist joint 28 mounted backplate 40 on which is mounted photodiode 38 (106). This relative movement produces an electrical signal (108) representative of such X and/or Y movement. This signal is compared with predetermined X and Y electrical signal levels (110) and then signal presence in excess of a minimum time duration (112) is determined to filter out false or unwanted mechanical vibrations. If the X or Y signals are less than a predetermined magnitude or are shorter than a predetermined time, the motion sensing apparatus will continue to monitor relative robot hand (gripper) to robot arm body relative movement (114) without interrupting robot arm movement. However, if the X or Y translation signals are more than a predetermined magnitude and persist for more than a predetermined time, compliant motion sensing apparatus 32 will cause robot arm motion to be interrupted (116).

Figure 8:
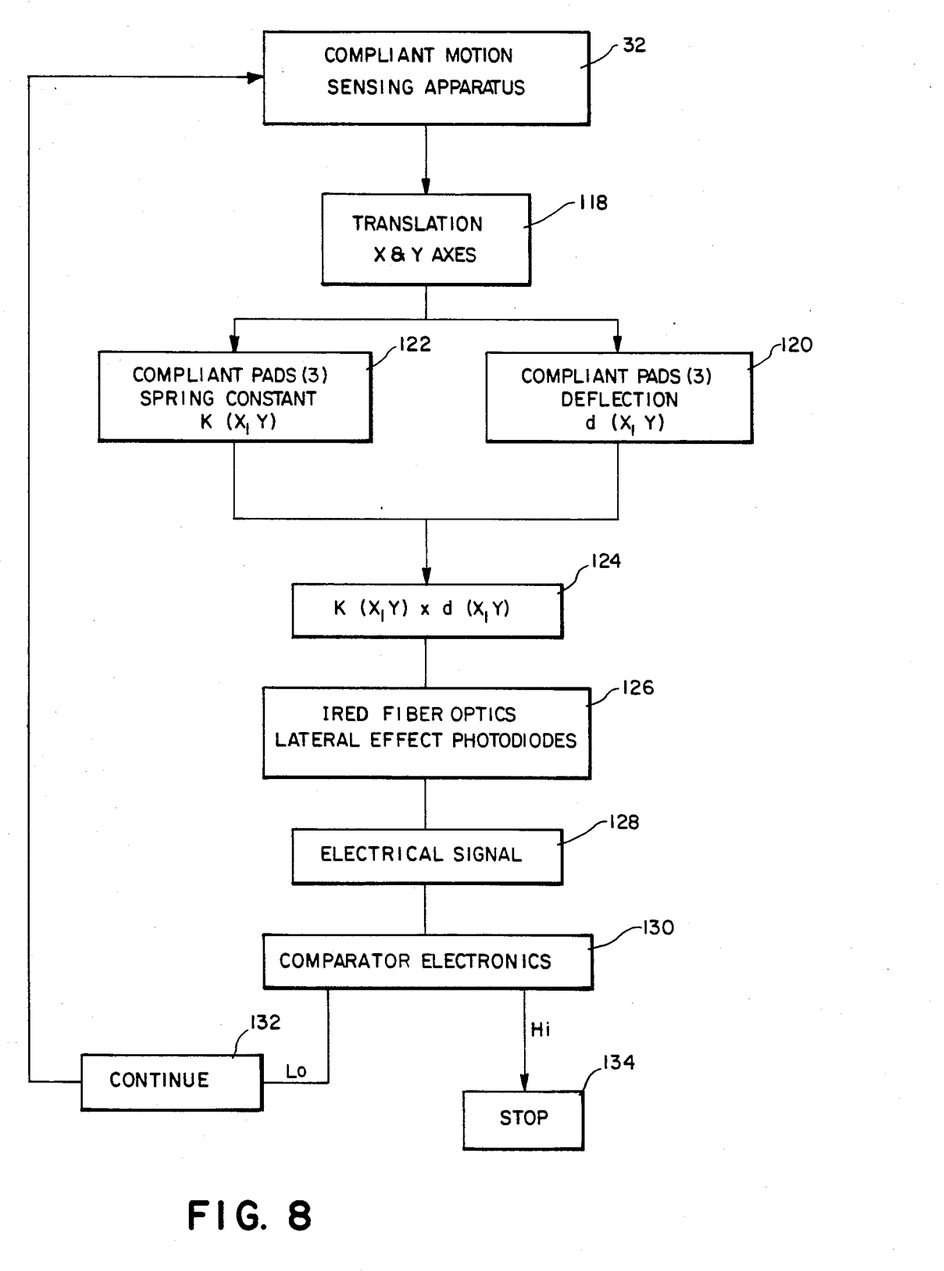
FIG. 8 is an information flow block diagram of the motion sensing apparatus of the present invention operating in its force generating/sensing mode of operation.

FIG. 8 shows an information flow block diagram of motion sensing apparatus 32 of the present invention operating in the robot arm force providing mode. With reference to FIGS. 4A, 4B and 8, if, for example, pin 84 should be brought into contact with a portion of fixedly mounted receiving member 88 by the lateral movement of robot arm assembly 10 (FIG. 1), pin 84 together with front plate 50 of motion sensing apparatus 32 will be laterally displaced or translated in an X and/or Y direction (118) against the tailored or chosen force of compliant pads 52a, 52b, etc. The lateral translation of pin 84 together with front plate 50 of motion sensing apparatus 32 in an X and/or Y direction cause compliant pads 52a, 52b, etc. to laterally deflect a corresponding distance "d" (120). The spring constants K (122) of said compliant pads combine as a product function (124) as said compliant pads are laterally deflected. As front plate 50 moves laterally, the spot of light from high intensity infrared light emitting diode 58 through multimode optical fibers 60 falling photosensitive surface 95 of lateral effect photodiode 38 will move from its initial position on said surface 104 to a position linearly related to the relative movement between front plate 50 and backplate 40 on which said diode 38 is mounted (126). This relative movement produces an electrical signal (128) representative of such X and/or Y movement. The signal is compared with desired X and/or Y electrical signal levels (130) whose magnitude(s) corresponds to a desired predetermined force. Forces that are generated by the robot arm result from robot arm deflection of compliant pads 52a, 52b, etc, having a known spring constant, a particular distance "d". The deflection of these compliant pads continues (132) until the desired predetermined force is established. Once the force is established, robot arm motion is terminated (134) and the established force is maintained.

In addition to the position determining or relative movement sensing and force generating modes described above motion sensing apparatus 32 can also be employed to determine the null or neutral position of robot hand or gripper 30. By monitoring the current of lateral effect photodiode 38 it is possible to precisely determine said null position which can greatly reduce robot arm programming time.

It will be apparent to those skilled in the art from the foregoing description of our invention that various improvements and modifications can be made in it without departing from its true scope. The embodiments described herein are merely illustrative and should not be viewed as the only embodiments that might encompass our invention.

What is claimed is:

1. Sensing apparatus for detecting relative movement between a pair of members along a given path, said apparatus comprising:
    a position sensing lateral effect photodiode mounted in fixed relation to one of said members, said photodiode having a given photosensitive surface extending generally in the direction of said path;
    an energizeable source of light;
    an optical fiber arrangement for directing light from said source to said photodiode and for forming a confined spot of light thereon, said optical fiber arrangement having one end thereof mounted in operative relation to said source and extending from a fixed location relative to the other of said members to a point where the other end of said optical fiber arrangement is in closely adjoining relation to said photosensitive surface to thereby produce said confined spot of light on said surface; and
    means coupled to said photodiode for producing a signal that is a continuous function of the position of said spot of light on said photosensitive surface.

2. The apparatus of claim 1, wherein said light source is a non-focused source, and further including a lens mounted in operative alignment to said source and said one end of said optical fiber arrangement to focus at least a portion of the light from said source on said one end for transmission of the focused light to the other end of said optical fiber arrangement.

3. The apparatus of claim 1, wherein said sensing apparatus is a compact apparatus having one of said members and the other of said members mounted in a closely spaced overlying relation to each other with said source mounted on one of said members in facing relation to said photodiode which is mounted on the other of said members, and said optical fiber arrangement is a relatively short arrangement extending transverse said members between said source and said photodiode.

4. The apparatus of claim 3, wherein a first of said members is fixedly mounted with respect to one end of a driven input portion of an elongated robotic arm and the second of said members is fixedly mounted with respect to one end of a load engaging output portion of said arm with said photosensitive surface extending generally transverse the longitudinal axis of said input portion and with said optical fiber arrangement extending along said longitudinal axis.

5. The apparatus of claim 4, wherein said input portion is an extended portion having a given longitudinal axis, said members are intercoupled to each other for resilient displacement in a direction generally normal to said longitudinal axis of said input portion.

6. Force sensing apparatus for a robotic arm having a driven input member and a load engaging output member, said apparatus comprising:
   means connecting said members together for resilient relative displacement in a t least a given plane; and
   means for detecting the relative displacement of said members in said given plane so as to determine the load forces acting in said given plane on said output member as a function of said displacement and the resiliency of said connecting means in said plane, said detecting means including a position sensing lateral effect photodiode fixedly mounted with respect to one of said members with its photosensitive surface extending in a direction parallel to said plane, and means for directing a spot of light to said photodiode from a fixed location with respect to the other of said members such that the position of said spot of light on said detector is a function of the relative displacement of said members in said direction, said directing means including an energizeable source of light, and an optical fiber arrangement for directing light from said source to said photodiode and for forming a confined spot of light thereon, said optical fiber arrangement having one end thereof mounted in operative relation to said source and extending from a fixed location relative to the other of said members to a point where the other end of said optical fiber arrangement is in closely adjoining relation to said photosensitive surface to thereby produce said confined spot of light on said surface, and means coupled to said photodiode for producing a signal that is a continuous function of the position of said spot of light on said photosensitive surface.

7. The invention of claim 6, wherein said members are extended members having one end thereof in a closely spaced, compact facing relation, said photodiode being fixedly positioned with respect to the end of one of said members with its photosensitive surface extending transverse the longitudinal axis of said one member and said source being mounted with respect to the other of said members in facing relation to said photodiode surface, said optical fiber arrangement being a relatively short arrangement extending transverse the ends of said members between said source and said detector surface, and said connecting means further includes at least one elastomeric element extending generally transverse said given plane with its ends mounted in fixed relation to respective ones of said input and output members, said elastomeric element having a relatively high longitudinal spring constant to essentially preclude displacement of said members in a plane normal to said given plane under relatively heavy load forces in said normal plane and a comparatively low lateral spring constant to permit displacement of said members in said given plane under comparatively light loads.

8. Relative movement sensing apparatus, comprising:
   a light source;
   a first member;
   a second member resiliently mounted on said first member, being relatively movable with respect thereto;
   a lateral effect photodiode having a light sensitive surface, said photodiode being mounted in a fixed position with respect to one of said members and including means for generating an electrical signal that is a continuous function of the relative position between said members; and
   an optical fiber for directing a portion of the light from said light source from a particular location relative to the other of said members, to a particular location on said light sensitive surface.

9. The apparatus of claim 8, wherein the means for resiliently mounting said second member on said first member includes a high compliance spring comprising a multiplicity of flat discs with each of said discs having a flat surface thereof adjacent the flat surface of another disc, the disc openings being generally orthogonal to a particular axial direction with said discs being encapsulated in an elastomeric material such that forces applied to said spring lateral to said axial direction can produce significant disc movement in said lateral direction and only negligible disc movement along said particular axial direction.

10. Robot arm drive force interrupting apparatus, comprising:
   a light source;
   an energizeable robot arm drive member;
   a robot arm driven member resiliently mounted on said drive member, being relatively movable with respect thereto;
   a lateral effect photodiode having a light sensitive surface, said photodiode being mounted in a fixed position with respect to one of said members and including means for generating an electrical signal that is a continuous function of the relative position between said members;
   an optical fiber for directing a portion of the light from said light source from a particular location relative to the other of said members, to a particular location on said light sensitive surface; and
   means responsive to said relative position signal for disabling said robot arm drive member when said signal is greater than or equal to a predetermined magnitude.

11. Drive force magnitude regulating apparatus, comprising:
   a light source;
   an energizeable drive member;
   a driven member mounted on said drive member through a spring member having a known spring rate, said driven member being movable with respect to said drive member;
   a lateral effect photodiode having a light sensitive surface, said photodiode being mounted in a fixed position with respect to one of said members and including means for generating an electrical signal that is a continuous function of the relative position between said members;

an optical fiber for directing a portion of the light from said light source from a particular location relative to the other of said members, to a particular location on said light sensitive surface; and means responsive to said relative position signal for controlling the movement of said drive member to thereby control the magnitude of the drive force provided by said driven member.

12. The apparatus of claim 8, wherein the means for mounting said second member to said first member includes a plurality of compliant pads.

13. The apparatus of claims 10 or 11, wherein the means for mounting the driven member to the drive member includes a plurality of compliant pads.

14. The apparatus of claims 8, 10 or 11, wherein said optical fiber is a multimode optical fiber.

15. The apparatus of claims 8, 10 or 11, wherein said optical fiber is a single mode optical fiber.

16. The apparatus of claims 8, 10 or 11, wherein one end of said optical fiber is spaced approximately two millimeters from the light sensitive surface of said lateral effect photodiode.

* * * * *